United States Patent [19]

Tateishi

[11] 4,181,959

[45] Jan. 1, 1980

[54] STORED INFORMATION TRANSFERABLE MEANS FOR A COMBINED ELECTRONIC DIGITAL SCALE AND CALCULATOR

[75] Inventor: Iwao Tateishi, Yamatokoriyama, Japan

[73] Assignee: Sharp Kabushiki Kaisha, Osaka, Japan

[21] Appl. No.: 854,206

[22] Filed: Nov. 23, 1977

[30] Foreign Application Priority Data

Nov. 30, 1976 [JP] Japan ............................ 51-162404[U]
Dec. 3, 1976 [JP] Japan ............................ 51-163001[U]

[51] Int. Cl.² .......................... G01B 3/08; G06F 7/38
[52] U.S. Cl. ..................................... 364/562; 33/138; 235/92 DN; 364/705
[58] Field of Search ............................ 364/560–562, 364/705; 235/92 DN, 92 CP, 92 MP; 33/121–124, 125 M, 125 R, 133, 141 R, 142, 137 R, 137 L, 140, 138; 242/84.8

[56] References Cited

U.S. PATENT DOCUMENTS

| | | | |
|---|---|---|---|
| 3,654,449 | 4/1972 | Boyce | 235/92 DN |
| 3,683,159 | 8/1972 | Welch et al. | 235/92 DN |
| 3,777,126 | 12/1973 | Hoff | 235/92 CP |
| 4,031,360 | 6/1977 | Soule, Jr. | 235/92 R |

*Primary Examiner*—Errol A. Krass
*Attorney, Agent, or Firm*—Birch, Stewart, Kolasch and Birch

[57] ABSTRACT

A plurality of memories are provided for respectively storing a series of distance information measured by extending the length of an extensible tape member which is attached to the length of an object to be measured. The memory is selected through the use of an N-nary counter and a decoder which are activated by both a memory key and a free key. A memory recall key is provided for indicating the distance information contained in the selected one of the memories in a display. An illumination lamp is employed for showing whether the distance information is appropriately stored in the selected memory. A CPU (central processor unit) is provided for controlling the distance information to provide a visual indication corresponding to the distance information in the display. The distance information is canceled through the use of a clear key, the distance information being stored in an up/down counter for counting signals responsive to pull-out and pull-in movement of the extensible tape member out and into the housing of combined electronic digital scale and calculator. A memory clear key is activated for canceling the memorized distance information in the memory.

26 Claims, 5 Drawing Figures

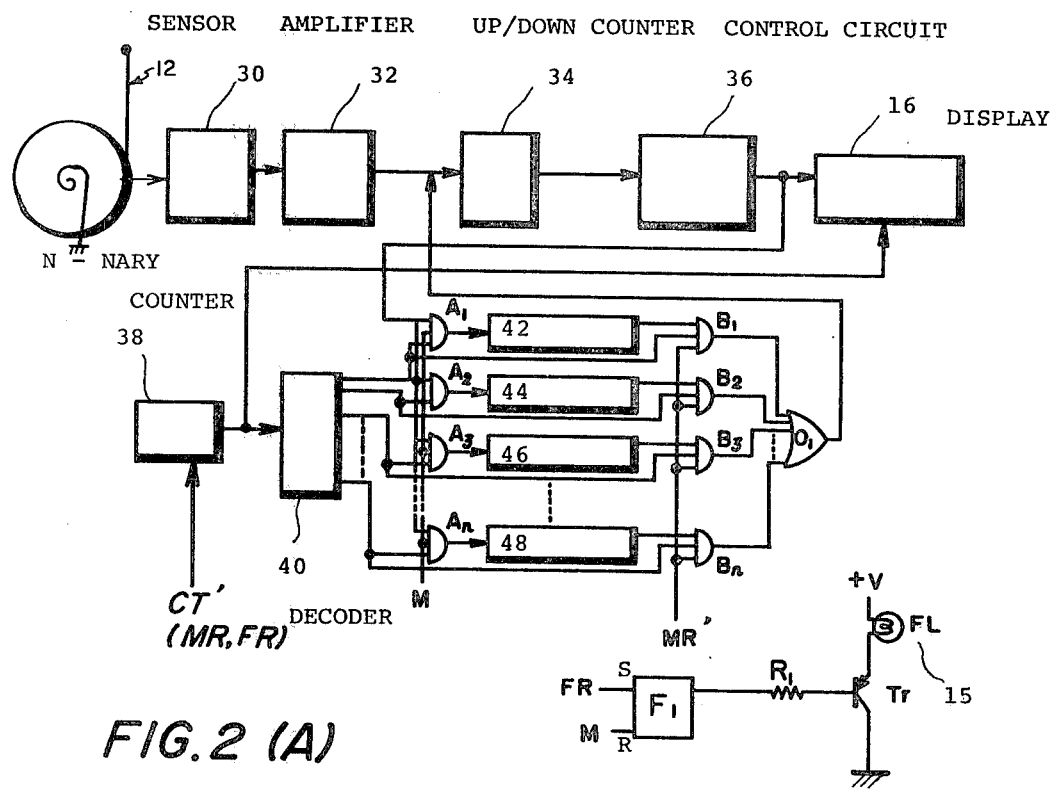
*FIG.2 (A)*
*FIG.2 (B)*
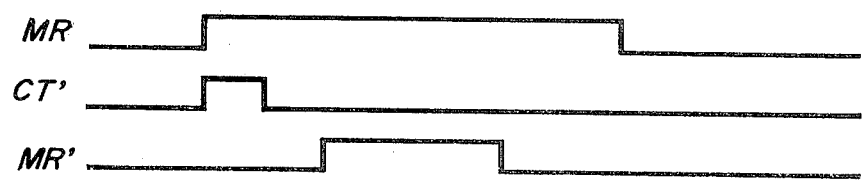
*FIG.3*

STORED INFORMATION TRANSFERABLE MEANS FOR A COMBINED ELECTRONIC DIGITAL SCALE AND CALCULATOR

BACKGROUND OF THE INVENTION

The present invention relates to a combined electronic digital scale and calculator and, more particularly, to a combined electronic digital scale and calculator which is adapted to transfer stored information to a memory for further treatment thereof.

A prior art measurement instrument was disclosed in Taylor U.S. Pat. No. 3,780,440 "MEASUREMENT INSTRUMENT" issued on Dec. 25, 1973. The measurement instrument did not have a memory which stores distance information derived from the results of measurements through the use of an extensible tape member which can be fitted to an object to be measured. Furthermore, a key input means was not provided for functioning to direct the measurement instrument how to manipulate the stored information and the following information introduced through the extensible member.

Therefore, a combined electronic digital scale and calculator is most desirable, which includes the above key input means for ensuring further variations of functions thereof.

OBJECTS AND SUMMARY OF THE INVENTION

Accordingly, an object of the present invention is to provide a novel combined electronic digital scale and calculator which simplifies measuring procedures to measure the length of an object considerable length.

Another object of the present invention is to provide a novel combined electronic digital scale and calculator which manipulates distance information introduced through the use of a key input means.

Still another object of the present invention is to provide a novel combined electronic digital scale and calculator having a plurality of memories which can subsequently store information responsive to respective measurement trials in response to a key input means.

Yet another object of the present invention is to provide a novel combined electronic digital scale and calculator which can place the original point of an extensible member in a spontaneous position thereof which is voluntarily extendable out of the housing of the combined electronic digital scale and calculator, the extensible member being fitted to an object when the length of the object is measured. Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, key input means are provided for demanding a combined electronic digital scale and calculator how to manipulate information introduced thereto. The key input means comprises a clear key, a memory key, a memory recall key, a free key, and a function key. The clear key is used for effecting a clear operation of the stored information in an up/down counter responsive to up and down information obtained from a photo detector disposed with respect to an extensible member. The memory key is activated for permitting the thus introduced information to be stored in a respective memory. The memory recall key is operated for transferring the stored information to a display to provide a visual indication thereon. The free key functions to allocate a specific memory to store the introduced information. The function key is activated for determining whether an adder/subtractor is to perform addition or subtraction. The combined electronic digital scale and calculator also functions as the well-known electronic calculator which calculates the introduced numeral information responsive to the actuation of any digit key or keys through the activation of a command key for directing the electronic calculator how to manipulate the information. The detail of the calculator is disclosed in U.S. Pat. No. 3,892,957 entitled "DIGIT MASK LOGIC COMBINED WITH SEQUENTIALLY ADDRESSED-MEMORY IN ELECTRONIC CALCULATOR CHIP", issued on July 1, 1975 and assigned to Texas Instruments Inc, etc.

In a preferred form, a plurality of memory means are provided for respectively storing the introduced information in response to the actuation of the memory key for introduction of the subsequent measurement information. The introduced information is visually indicated by the display in accordance with the actuation of the memory recall key. The information is transferred to the memory selected by the free key for storage thereof. An illumination lamp is provided for indicating that the information is correctly stored in the selected memory.

In another preferred form, a CPU is provided for controlling the information stored in the up/down counter, the memory, the display, and the adder/subtractor in response to the actuation of the key input means.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

FIGS. 2(A) and 2(B) are block diagrams of a processor circuit included within the combined electronic digital scale and calculator shown in FIG. 1, respectively;

FIG. 3 is a time chart showing various signals occurring within the processor circuit.

DESCRIPTION OF THE PREFERRED EMBODIMENTS

Figure 1:
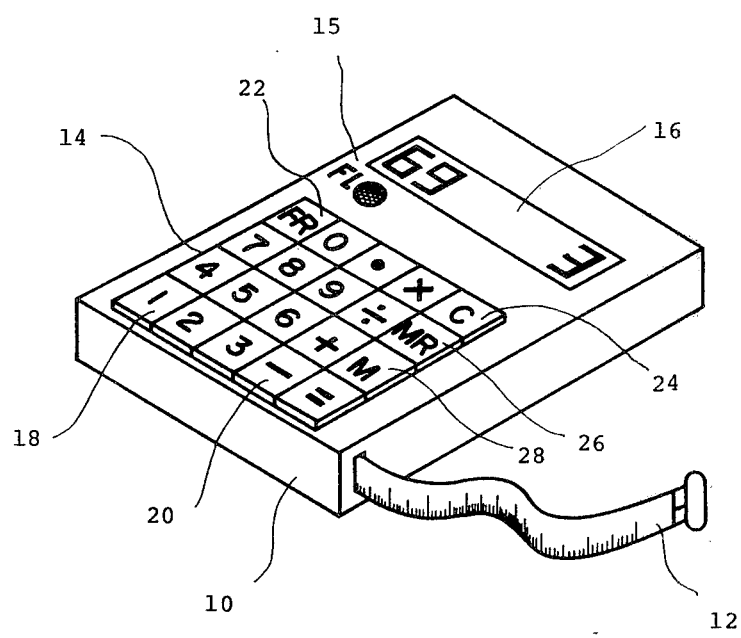
FIG. 1 is a perspective view of a combined electronic digital scale and calculator of an embodiment of the present invention.

FIG. 1 shows a combined electronic digital scale and calculator 10 of the present invention which includes an extensible tape member 12, a key board 14, an illumination lamp 15 and a display 16. The extensible tape member 12 can be pulled out of the housing of the combined electronic digital scale and calculator 10 to measure the length of an object by attachment to the object.

The length of the object is determined by the amount of the extended length of the extensible tape member 12 out of the housing of the combined electronic digital scale and calculator 10. The extensible tape member 12 is constantly being forced into the housing by a spring means loaded in a reel (not shown) which accommodates and stores the tape member 12.

The keyboard 14 comprises a plurality of numeral keys 18, function keys 20, a free key 22, a clear key 24, a memory recall key 26, and a memory key 28. The numeral keys 18 function to introduce numeral information into the combined electronic digital scale and calculator 10 in response to actuation thereof. The function keys 20 are used for commanding the combined electronic digital scale and calculator 10 to process the introduced numeral information. The free key 22 functions to select the memory which will store distance information entered by the extensible tape member 12. The clear key 24 is activated for functioning clear operation of the stored information such as the numeral information and the distance information. The memory recall key 26 is used for transferring the information stored in the memory to the display 16 to provide the visual indication responsive to the information therein. The memory key 28 is operated for storing the information such as the numeral information and the distance information to a memory selected by the free key 22.

The illumination lamp 15 is excited to indicate the distance information as to the extensible tape member 12 to be stored in the selected memory. The display 16 shows the numeral information and the distance information, which, for example comprises a liquid crystal display.

FIGS. 2(A) and 2(B) illustrates the circuit configuration employed within the combined electronic digital scale and calculator 10, wherein the distance information as to the extensible tape member 12 is subsequently memorized as described hereinbelow.

The circuit configuration shown in FIG. 2(A) comprises a sensor 30, an amplifier 32, an up/down counter 34, a control circuit 36, the display 16, an N-nary counter 38, a decoder 40, a plurality of memories 42, 44, 46 and 48, AND gates A1 through An and B1 through Bn, and an OR gate 01. The circuit configuration described in FIG. 2(B) comprises a flip-flop F1, a transistor Tr, and the illumination lamp 15.

The sensor 30 detects the travel of the extensible tape member 12 in determining the measured length, which includes a couple of light emitting elements and a light receiving element and provides signals corresponding to the travel distance of the extensible tape member 12. The amplifier 32 amplifies the signals up to a predetermined level sufficient for subsequent treatment within the circut configuration, which includes a signal shaper.

The up/down counter 34 is responsible for an increase or decrease in the length of the extensible tape member 12 to increment or decrement the corresponding counter. The control circuit 36 is adapted to adjust the outputs of the up/down counter 34 to become available for the display 16. The N-nary counter 38 counts up by one in response to a signal CT' developed through the actuation of either the memory recall key 26 or the free key 22. The decoder 40 provides control signals applied to the AND gates A1 through An in accordance with the output generated from the N-nary counter 38. The AND gates A1 through An receive input signals from the memory key 28 and the output from the decoder 40 and the control circuit 36 to turn on and transfer the input information thereof, respectively.

A series of the memories 42, 44, 46 and 48 are provided for storing the distance information derived from the AND gates A1 through An, respectively. The AND gates B1 through Bn receive the outputs of both the memories 42, 44, 46 and 48 and the decoder 40 and the input signals derived from the memory recall key 26. The output of the memories 42, 44, 46 and 48 are introduced into the OR gate $0_1$ to conduct the OR gate $0_1$ and provides the output thereof to the up/down counter 34.

The flip-flop F1 receives an input signal via the free key 22 as the set signal thereof and an input signal via the memory key 28 as the reset signal thereof and provides the output thereof for the transistor Tr through a resistor R1.

The transistor Tr controls the illumination lamp 15 to indicate appropriate storage location of the distance information in the selected memory among the memories 42, 44, 46 and 48.

Memory operations are as follows:

The distance information is provided from the sensor 32 by determining the traveled movement of the extensible tape member 12 via a couple of the light emitting element and the light receiving element. The distance information is introduced into the up/down counter 34 after amplifying and shaping by the amplifier 32. The up/down counter 34 adds and reduces its counts in accordance with count-up signals of the distance information responsive to pull-out movement of the extensible tape member 12 and count-down signals of the distance information responsive to drawn-in movement thereof. The distance information is indicated in the display 16 under control of the control circuit 36.

The introduced distance information is memorized as described hereinbelow. The free key 22 is activated for advancing the N-nary counter 38 by one count through the input signal CT'. The outputs from the N-nary counter 38 are entered into the decoder 40 to control the decoder 40 which in turn transmits the outputs of the N-nary counter 38 to provide signals corresponding to the output, the signals being applied to a selected AND gate, for example, A1 among the AND gates A1 through An.

The AND gates A1 through An further receive the distance information developed at the control circuit 36. Under these conditions, the memory key 28 is energized for conducting the AND gate A1 selected by the N-nary counter 38 to thereby store the distance information in the memory 42. Now further measurements are available.

The free key 22 is subsequently activated for further measurement, wherein the N-nary counter 38 is advanced in response to the signal CT' to thereby control the decoder 40 and the display 16. The display 16 ceases the indication corresponding to the previous distance information. The subsequent measurement is achieved by the extensible tape member 12 as described above. The subsequent distance information is similarly entered into the control circuit 38 through the sensor 30, the amplifier 32, and the up/down counter 34 to provide the indication corresponding thereto in the display 16.

The decoder 40 selects a specific AND gate except for the AND gate A1, for example, A2 through the conversion of the value of the counter contained in the N-nary counter 38. Under these circumstances, the subsequent distance information is introduced into the memory 44 through the actuation of the memory key 28, the subsequent distance information being stored in the control circuit 36. Similarly, the remaining memories 46 and 48 can store the further subsequent distance information through the subsequent actuation of the free key 22 and the memory key 28, respectively.

The flip-flop F1 is set by the activation of the free key 22 to thereby enable the illumination lamp 15 through the transistor Tr. The memory key 28 resets the flip-flop F1 to disable illumination lamp 15, whereby it is indicated that the distance information is stored in a memory selected among the memories 42, 44, 46 and 48.

When the distance information stored in the memories 42 through 48 is to be visually indicated in the display 16, the memory recall key 26 is activated for advancing the N-nary counter 38 by one count. The memory recall key 26 should be activated the number of times which corresponds to the number of activations of the memory key 28 in storing the respective distance information. The encoder 40 is controlled by the N-nary counter 38 to provide outputs applied to the AND gates B1 through Bn. The AND gates further receive the outputs from the memories 42, 44, 46 and 48 and the memory recall key 26 to conduct the OR gate 01. The outputs of the OR gate 01 are introduced into the up/down ocunter 34 for displaying in the display 16 through the control circuit 36. The display 16 is simultaneously controlled by the N-nary counter 38 to indicate which memorized distance information is now displayed therein. That is, the order of the memorized distance information which is stored in the N-nary counter 38 is indicated in the display 16 by enabling one of the remaining digits except for showing the distance information.

FIG. 3 shows a time chart of wave forms CT' and MR' responsive to the memory recall key 26, MR' representing the actuation of the memory recall key 26 at a high level. The CT' signal is developed in response to the initiation of the memory recall key 26 to add the counter contained in the N-nary counter 38. On the other hand, the MR' signal is generated after the elimination of the CT' signal to transfer the distance information contained in the memories 42 through 48 in response to the actuation of the memory recall key 26. The CT' signal is further developed in response to the actuation of the free key 22.

Figure 4:
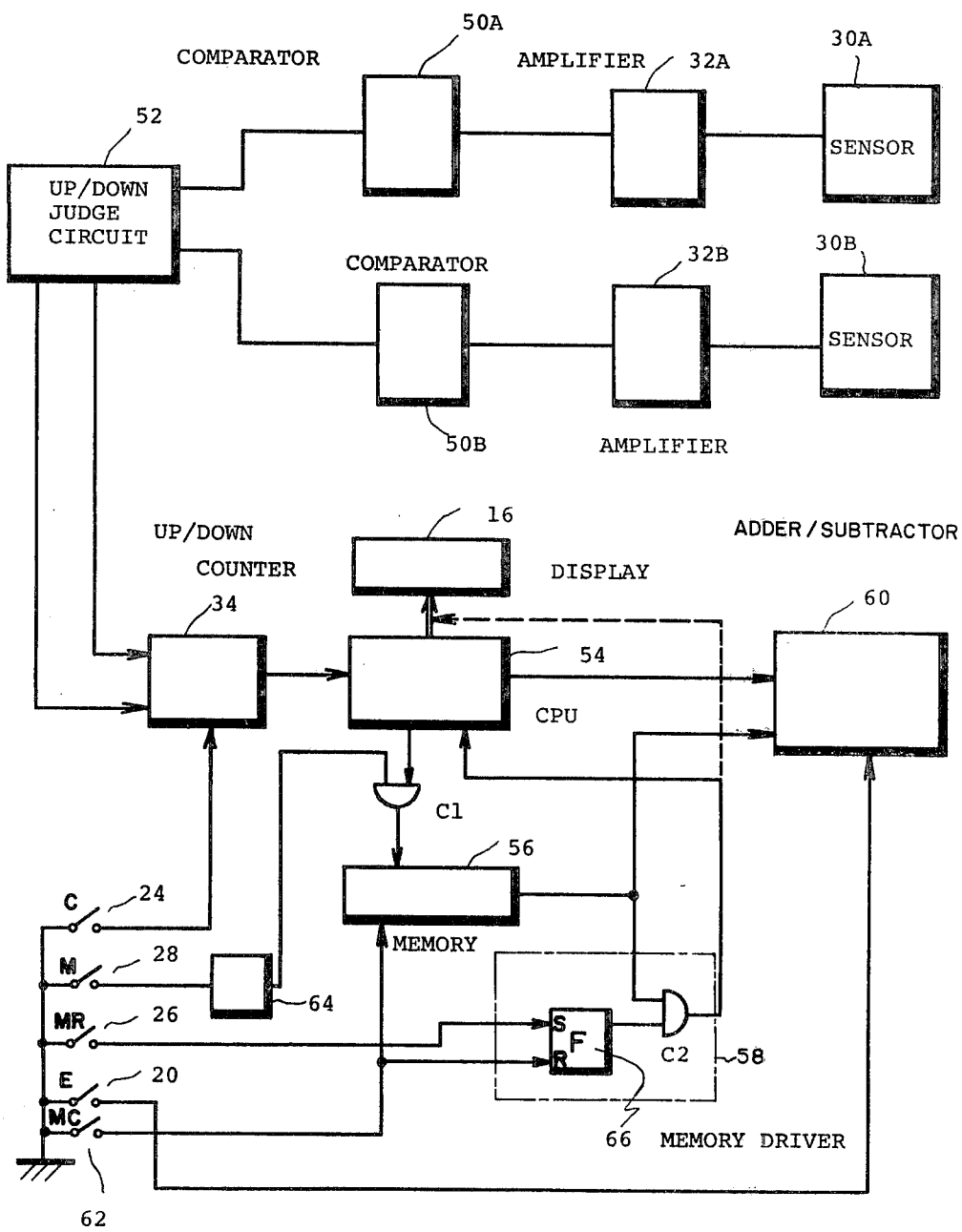
FIG. 4 is a block diagram of a processor circuit included within a combined electronic digital scale and calculator of another embodiment of the present invention.

FIG. 4 illustrates another circuit configuration of another embodiment of the present invention, which mainly comprises a couple of sensors 30A and 30B, amplifiers 32A and 32B, comparators 50A and 50B, an up/down judge circuit 52, the up/down counter 34, a CPU 54, a memory 56, a memory driver 58, an adder/subtractor 60, and the display 16. Like numerals to those of FIGS. 1 and 2(A) represent like elements.

The sensors 30A and 30B respectively comprise a couple of light emitting elements and light receiving elements as in the sensor 30. The sensors 30A and 30B develop signals which have a 90° phase difference from each other to determine either increase or decrease of the length of the extensible tape member 12. The respective signal is amplified by the amplifiers 32A and 32B. The comparators 50A and 50B comprising Schmidt circuits shape the outputs of the amplifiers 32A and 32B. The up/down judge circuit 52 determines whether the outputs from the comparators 50A and 50B are either count-up information corresponding to the increase of the extending length of the extensible tape member 12 or count-down information corresponding to the decrease of the extending length thereof.

Count-up and count-down signals are developed from the up/down judge circuit 52 and then applied to the up/down counter 34 to count themselves. The count-up/count-down information is introduced into the CPU 54 for processing purposes. The display 16 indicates the distance information in accordance with control of the CPU 54. The sensors 30A and 30B develop the signals of which units are converted from units of the length of the extensible tape member 12 in to predetermined pulses. The CPU 54 demodulates the conversion rate of the unit of the extending length i.e. the pulses.

The key board 14 comprises the clear key 24, the memory key 28, the memory recall key 26, the function keys 20, and a memory clear key 62. The clear key 24 is activated for resetting the distance information stored in the up/down counter 34 to there by extinguish the indication shown in the display 16. Therefore, the distance information corresponding to the extended length of the extensible tape member 12 is canceled without complete pull-in movement of the extensible tape member 12 into the housing of the combined electronic digital scale and calculator 10. With such an arrangement, further measurement of the length of the object is available through the further travel of the extensible tape member 12. That is, the extended length of the extensible tape member 12 is identified as the original point for the further travel thereof.

The memory key 28 is operated for storing the distance information contained in the up/down counter 34. Input signals from the memory key 28 are introduced into an one-shot mono-multivibrator 64. A memory signal is developed from the one-shot mono-multivibtator 64 for conducting an AND gate C1 to transfer the distance information contained in the up/down counter 34 to the memory 56 through the CPU 54.

The memory recall key 26 functions to transfer the distance information from the memory 56 to the display 16. An input signal from the memory recall key 26 sets a flip-flop 66 to conduct an AND gate C2, the flip-flop 66 and the AND gate C2 being included within the memory driver 58, whereby the distance information in the memory 56 is transmitted to the CPU 54 and the display 16 for displaying purposes.

The distance information is canceled by the actuation of the memory clear key 62 which resets the flip-flop 66 and controls the memory 56. The above memory function for the distance information permits the further measurement of the length of the object to be available.

The function keys 20 are provided for instructing the adder/subtractor 60 to manipulate the distance information in the memory 56 and the subsequent distance information in the up/down counter 34. The distance information in the memory 56 is directly introduced into the adder/subtractor 60 and the subsequent distance information is entered into the adder/subtractor 60 through the CPU 54. The function keys 20 comprises an addition command key and a subtraction command key. The results of calculations by the adder/subtractor 60 are transferred to the CPU 54 and then the display for displaying purposes.

It will be apparently noted that the present invention is equally applicable to a digital scale only, although the above description has been made about the combined digital scale and calculator 10.

The invention being thus described, it will be obvious that the same many be varied in may ways. Such variations are not to be regarded as a departure from the spirit and scope of the invention, and all such modifications are intended to be included within the scope of the following claims.

What is claimed is:

1. An electronic digital scale comprising:
   a housing;
   an extensible member adapted to be pulled in and out of the housing to fit an object to be measured;
   a spring loaded reel means for accommodating and storing the extensible member therein and rotating in response to the extension of said member with respect to said housing;
   a detector means directly coupled to the spring loaded reel means for detecting the rotations of the spring loaded reel means and providing output signals in response to said rotation representative of the extended length of said extensible member;
   memory means having a plurality of addresses for receiving said output signals from the detector and storing the said output signals therein;
   a display means for receiving stored output signals from said memory means and said output signals from said detector means;
   a memory key means for causing the said output signals from said detector means to be stored in said memory means in a selected address;
   a memory recall key means for transferring the said stored detector output signals from said memory means to said display means;
   a memory clear key means for cancelling the said stored output signals from said memory means; and
   memory control means interconnected with said memory means and said memory key and memory recall key means responsive to a predetermined number of sequential actuations of said memory key means and said memory recall key means to store and display information, respectively, at and from a selected memory address.

2. The electronic digital scale as recited in claim 1, wherein said memory key means comprises a memory key for directing an output signal from said detector means to be stored in a preselected one of the memory addresses of said memory means; and a free key for allocating said preselected one of the memory addresses of said memory means for said memory key through said memory control means to permit said memory key to direct the storage of a said detector output signal.

3. The electronic digital scale as recited in claim 1, wherein said memory control means comprises an N-nary counter, a decoder having a plurality of outputs driven by said counter to enable a selected one of its said outputs and a plurality of memory address gate means corresponding one to each decoder output and driven thereby;
   said N-nary counter being responsive to said free key and said recall key means in conjunction with said decoder outputs for selecting a particular one of said memory addresses and controlling the entry of detector output signals therein.

4. The electronic digital scale as recited in claim 3, wherein said memory address gate means comprise a series of AND gates each said AND gate receiving and responsive to, in conjunction, an output from said decoder, actuation of said memory key, and said output signals from said detector means.

5. The electronic digital scale as recited in claim 3, wherein said scale further includes memory output gate means for outputting a stored signal from a selected memory address, comprising:
   a second series of AND gates corresponding one to each memory address responsive, in conjunction, to the stored signal in a corresponding said memory address, said output signals from said decoder means, and the actuation of said memory recall key.

6. The electronic digital scale as recited in claim 5, wherein said memory output gate means further comprises an OR gate driven by said second series of AND gates and includes an output driving said decoder means to transfer said stored signal in a memory address selected by said memory recall key means to said detector means; and
   wherein said detector means further includes an up-/down counter means for receiving said selected stored signal from said OR gate and directing same through said detector means to said display means.

7. The electronic digital scale as recited in claim 2, which further includes a flip-flop responsive to the respective actuations of said free key and said memory key to provide SET and RESET outputs, respectively;
   a transistor responsive to become conductive and non-conductive, respectively, by the presence of said SET and RESET outputs of said flip-flop; and
   an illumination lamp illuminated by said transistor in response to said SET output for visually indicating that one of the said memory addresses is appropriately allocated to receive an output signal of said detector means upon actuation of said memory key, said actuation of said memory key serving to extinguish said lamp to indicate completion of such storage.

8. The electronic digital scale as recited in claim 7, wherein said memory control means comprises an N-nary counter, a decoder having a plurality of outputs driven by said counter to enable a selected one of its said outputs and a plurality of memory address gate means corresponding one to each decoder output and driven thereby;
   said N-nary counter being responsive to said free key and said recall by means in conjunction with said decoder outputs for selecting a particular one of said memory addresses and controlling the entry of detector output signals therein.

9. The electronic digital scale as recited in claim 7, wherein said memory address gate means comprise a series of AND gates each said AND gate receiving and responsive to, in conjunction, an output from said decoder, actuation of said memory key, and said output signals from said detector means.

10. The electronic digital scale as recited in claim 7, wherein said scale further includes memory output gate means for outputting a stored signal from a selected memory address, comprising:
    a second series of AND gates corresponding one to each memory address responsive, in conjunction, to the stored signal in a corresponding said memory address, said output signals from said decoder means, and the actuation of said memory recall key.

11. The electronic digital scale as recited in claim 7, wherein said memory output gate means further comprises an OR gate driven by said second series of AND gates and includes an output driving said decoder means to transfer said stored signal in a memory address selected by said memory recall key means to said detector means; and wherein said detector means further includes an up-/down counter means for receiving said selected stored signal from said OR gate and directing same through said detector means to said display means.

12. An electronic digital scale comprising:
a housing;
an extensible member adapted to be pulled in and out of the housing to fit an object to be measured;
a spring loaded reel means for accommodating and storing the extensible member therein and rotating in response to the extension of said member with respect to said housing;
a detector means directly coupled to the spring loaded reel means for detecting the rotations of the spring loaded reel and providing output signals in response to said rotation representative of the extended length of said extensible member;
memory means for receiving said output signals from the detector and storing the said output signals therein;
a display means for receiving stored output signals from said memory means;
a memory key means for causing the said output signals from said detector means to be stored in said memory means;
a memory recall key means for transferring the said stored detector output signals from said memory means to said display means; and
a memory clear key means for cancelling the said stored output signals from said memory means.

13. The electronic digital scale of claim 12, wherein said memory means comprises a plurality of independent memory locations; and wherein said digital scale further includes logic means responsive to a predetermined number of sequential actuations of said memory key means and said memory recall key means for preselecting a said memory location corresponding to said number of actuations for receiving an output signal from said detector, transferring said output signal from said detector to said preselected location subsequent to the preselection thereof and displaying said stored signal from a said preselected location.

14. The electronic digital scale of claim 13, wherein said memory key means comprises a memory key for directing an output signal from said detector means to be stored in a preselected one of said independent memory locations and a free key for preselecting the said one of said independent memory locations through said logic means to thereafter permit said memory key to direct such storage therein.

15. The electronic digital scale as recited in claim 14, wherein said logic means comprises an N-nary counter, a decoder having a plurality of outputs driven by said counter to enable a selected one of its said outputs and a plurality of memory location gate means corresponding one to each decoder output and driven thereby;

said N-nary counter being responsive to said free key and said recall key means in conjunction with said decoder outputs for selecting a particular one of said memory locations and controlling the entry of detector output signals therein.

16. The electronic digital scale as recited in claim 15, wherein said memory location gate means comprises a series of AND gates, each said AND gate receiving and responsive to, in conjunction, an output from said decoder, actuation of said memory key, and said output signals from said detector means.

17. The electronic digital scale as recited in claim 15, wherein said scale further includes memory output gate means for outputting a stored signal from a selected independent memory location, comprising:

a second series of AND gates corresponding one to each said independent memory location responsive, in conjunction, to the stored signal in a corresponding said memory location, said output signals from said decoder means and the actuation of said memory recall key.

18. The electronic digital scale as recited in claim 17, wherein said memory output gate means further comprises an OR gate driven by said second series of AND gates and includes an output driving said decoder means to transfer said stored signal in a said independent memory location selected by said memory recall key means to said detector means; and wherein said detector means further includes an up-/down counter means for receiving said selected stored signal from said OR gate and directing same through said detector means to said display means.

19. The electronic digital scale as recited in claim 14, which further includes a flip-flop responsive to the respective actuations of said free key and said memory key to provide SET and RESET outputs, respectively;

a transistor responsive to become conductive and non-conductive, respectively, by the presence of said SET and RESET outputs of said flip-flop; and
an illumination lamp illuminated by said transistor in response to said SET output for visually indicating that one of the said independent memory locations is appropriately allocated to receive an output signal of said detector means from actuation of said memory key, said actuation of said memory key serving to extinguish said lamp to indicate completion of such storage.

20. In an electronic digital scale having a housing and an extensible member mounted on a reel means within said housing and being extensible and retractible between one or a plurality of measurement positions, and means for providing a resultant measurement as a function of said measurement positions comprising:

sensing means driven by said reel means for providing up and down signal pulses in response to extensions and retractions, respectively, of said extensible member with respect to said housing;
key input means for selecting a desired resultant measurement;
processor means responsive to key input means for controlling the determination of said resultant measurement;
up/down counter means responsive to said sensing means and said key input means for providing input parameters to said processor means required for said determination of said resultant measurement; and
display means driven by said processor means for displaying said resultant measurement;
said sensing means comprising:
sensor means providing first signals representative of extensions and retractions of said extensible member;

amplifier means driven by said first signals to provide amplified second signals corresponding to said first signals;

comparator means for shaping said second signals to provide third signals representative of the magnitude of displacement of said extensible member between successive positions; and up/down judge circuit means driven by said third signals and responsive to the sense of said displacement of said extensible member to provide said up and down signal pulses.

21. In an electronic digital scale having a housing and an extensible member mounted on a reel means within said housing and being extensible and retractible between one or a plurality of measurement positions, and means for providing a resultant measurement as a function of said measurement positions comprising:

sensing means driven by said reel means for providing up and down signal pulses in response to extensions and retractions, respectively, of said extensible member with respect to said housing;

key input means for selecting a desired resultant measurement;

processor means responsive to key input means for controlling the determination of said resultant measurement;

up/down counter means responsive to said sensing means and said key input means for providing input parameters to said processor means required for said determination of said resultant measurement; and display means driven by said processor means for displaying said resultant measurement;

said processor means comprising:

central processing means for coordinating the operation of said processor and said display means;

a memory means for storing measurement position data and resultant measurement data therein; and an adder/subtractor means controlled by said central processing means and responsive to said measurement position data stored in said memory means for determining said resultant measurement;

said resultant measurement data from said memory means being displayed on said display means in response to said central processing means.

22. An electronic digital scale in accordance with claim 21 wherein said key input means comprises:

a clear key means for clearing the contents of said up/down counter means;

a memory key means for introducing said measurement position data into said memory means;

a memory recall key means for transferring said measurement position data from said memory means to said display means;

a memory clear key means for clearing the contents of said memory means thereby erasing the contents of said display means; and a function key means for directing said adder/subtractor means to determine said resultant measurement.

23. An electronic digital scale in accordance with claim 22 wherein said processor means further comprises:

a memory driver means responsive to said key input means and an output from said memory means for transmitting said measurement position data from said memory means to said central processing means for subsequent display by said display means.

24. An electronic digital scale in accordance with claim 21, wherein said sensing means comprises:

sensor means providing first signals representative of extensions and retractions of said extensible member;

amplifier means driven by said first signals to provide amplified second signals corresponding to said first signals;

comparator means for shaping said second signals to provide third signals representative of the magnitude of displacement of said extensible member between successive positions; and up/down judge circuit means driven by said third signals and responsive to the sense of said displacement of said extensible member to provide said up and down signal pulses.

25. An electronic digital scale in accordance with claim 24, wherein said key input means comprises:

a clear key means for clearing the contents of said up/down counter means;

a memory key means for introducing said measurement position data into said memory means;

a memory recall key means for transferring said measurement position data from said memory means to said display means;

a memory clear key means for clearing the contents of said memory means thereby erasing the contents of said display means; and a function key means for directing said adder/subtractor means to determine said resultant measurement.

26. An electronic digital scale in accordance with claim 24, wherein said processor means further comprises:

a memory driver means responsive to said key input means and an output from said memory means for transmitting said measurement position data from said memory means to said central processing means for subsequent display by said display means.

* * * * *